Nov. 11, 1958  D. M. FENSKE ET AL  2,859,659
DATA PLOTTING AND INDICATING DEVICE
Filed Sept. 12, 1955  3 Sheets-Sheet 1
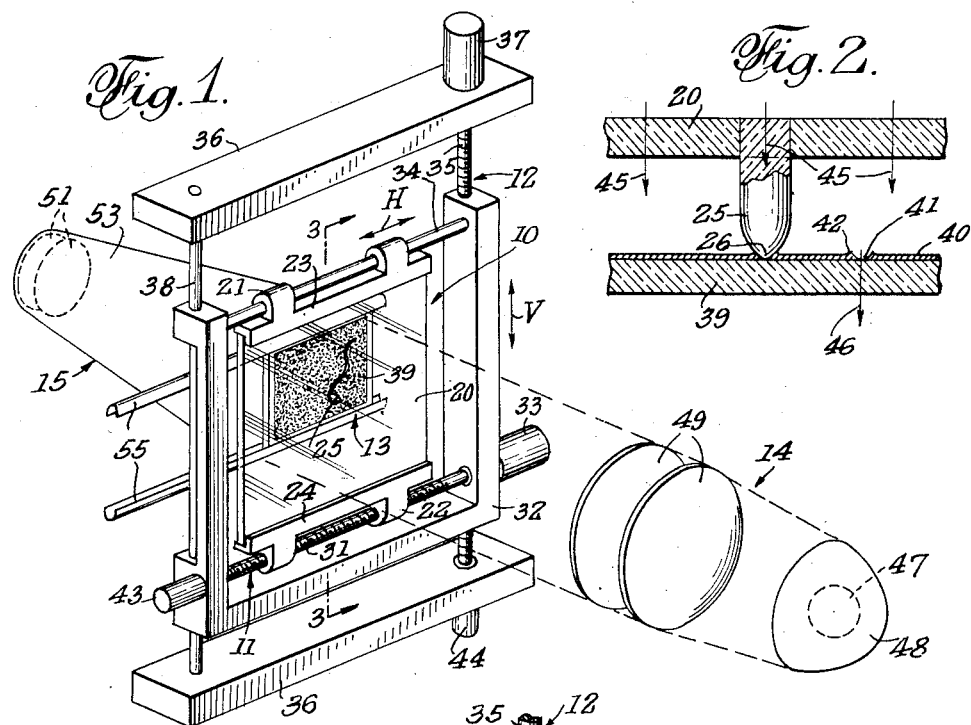
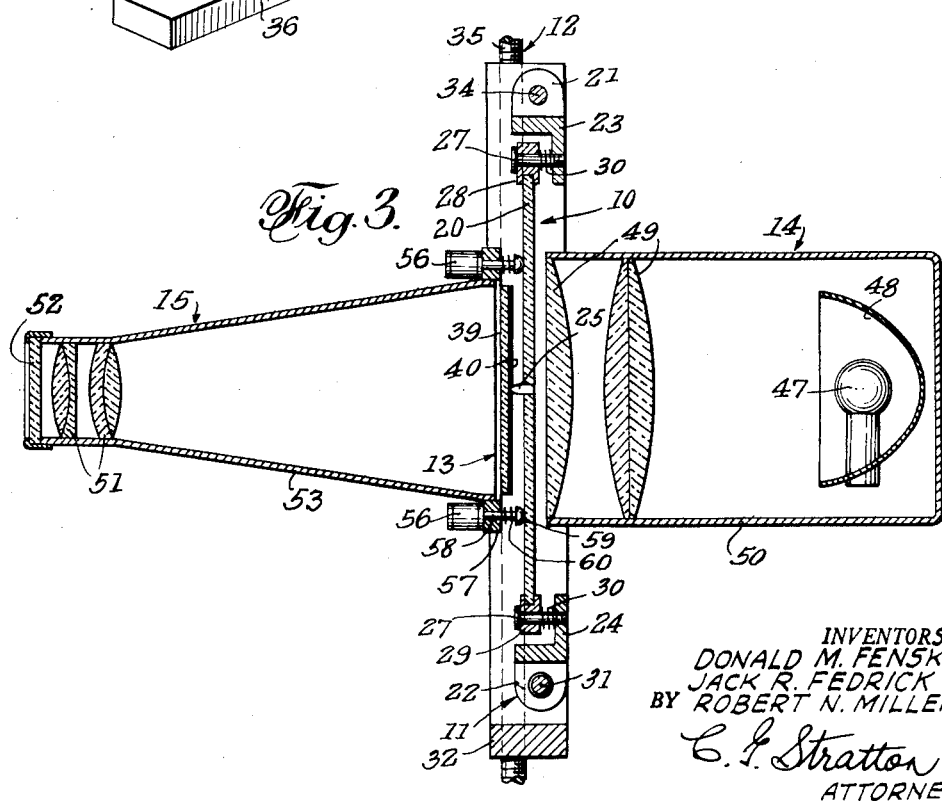
INVENTORS
DONALD M. FENSKE
JACK R. FEDRICK
ROBERT N. MILLER
BY C. J. Stratton
ATTORNEY Nov. 11, 1958  D. M. FENSKE ET AL  2,859,659
DATA PLOTTING AND INDICATING DEVICE
Filed Sept. 12, 1955  3 Sheets-Sheet 2
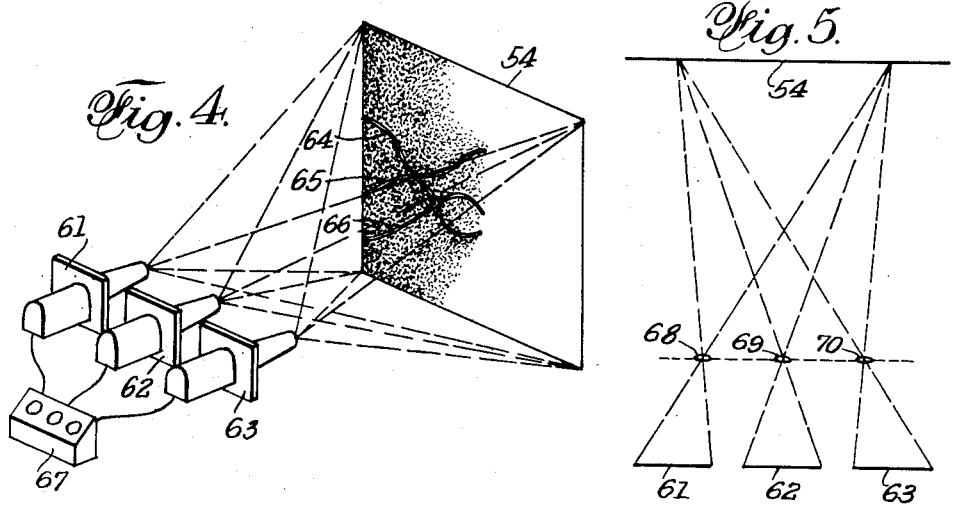
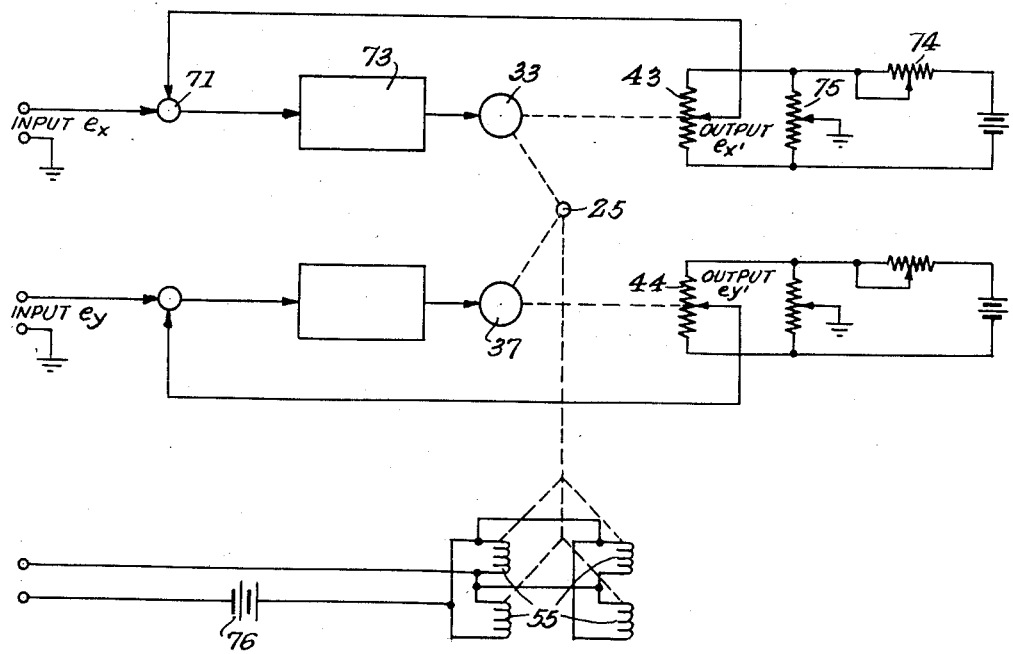
INVENTORS
DONALD M. FENSKE
JACK R. FEDRICK
BY ROBERT N. MILLER
C. J. Stratton
ATTORNEY Nov. 11, 1958   D. M. FENSKE ET AL   2,859,659
DATA PLOTTING AND INDICATING DEVICE
Filed Sept. 12, 1955   3 Sheets-Sheet 3
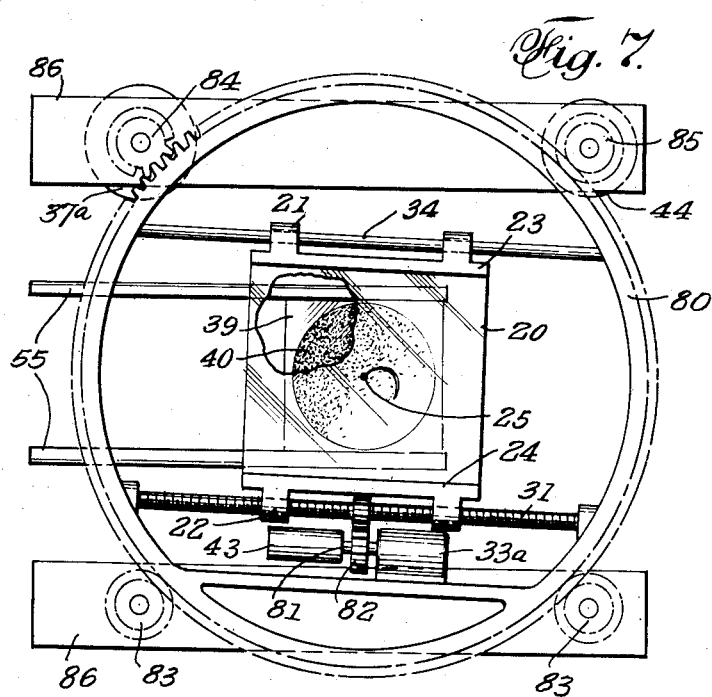
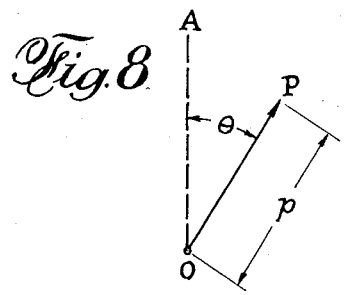
INVENTORS
DONALD M. FENSKE
JACK R. FEDRICK
BY ROBERT N. MILLER
C. G. Stratton
ATTORNEY

United States Patent Office 2,859,659
Patented Nov. 11, 1958

2,859,659
DATA PLOTTING AND INDICATING DEVICE

Donald M. Fenske, Hermosa Beach, Jack R. Fedrick, Downey, and Robert N. Miller, Hermosa Beach, Calif., assignors to Fenske, Fedrick & Miller, Inc., Los Angeles, Calif., a corporation of California Application September 12, 1955, Serial No. 533,587

13 Claims. (Cl. 88—24)

This invention relates to the art of graphically presenting data of various kinds, the invention dealing with apparatus for recording and indicating data in graphical form. The present invention relates more particularly to improvements which clarify the presentation of data in graphic form and extend the scope of application of such data.

In most fields of business, engineering, agriculture, the military, etc., obtaining, coordinating and using information of various kinds are important factors tending to improve methods of approach, operation, merchandising, etc., that enhance growth, improve stability, and generally inure to the welfare of the particular endeavor. Various forms of recording indicators have been used for the above-mentioned purpose. The simplest form consists of a marking stylus or instrument, a chart on which said instrument may mark to record some function or other data, and mechanism to change the potential relationship of the instrument and chart in accordance with electrical and/or mechanical signals or factors that are supplied from external sources. Such an instrument usually operates in a single plane and the motion thereof in said plane is controlled by two transversely applied variables to record, indicate and/or plot input information on the face of the chart associated therewith. Other types of data may be directly plotted in graphic form. Thus, not only a valuable record is provided, but the same affords visual observations of magnitudes, trends, movements, behavior patterns, etc., which cannot be conveniently obtained in other ways.

It is contemplated that the invention provide means to satisfy the need for large-scale or multiple-channel plotting equipment, since the uses for such equipment are deemed to be manifold, as above indicated. More specific plotting uses include recording of computer outputs, monitoring of industrial processes and/or control systems, rapid collection of research and/or engineering data, etc. The many uses for multiple-channel plotting include such functions as automatic tracking and plotting of ship and aircraft movement, functions that can be recorded and plotted quickly and accurately so that integration of information may be facilitated. Combining of automatic data collection and multiple plotter presentation may be carried out by the present invention, a process not possible with present plotters. The advantage to the military is deemed to be obvious, particularly in the continuous plotting of intersecting functions as depicting craft movement.

Most factors that can be qualitatively and/or quantitatively measured may be made to control a recording indicator. While the range of applications of such indicators is extremely large and despite their inherent and indicated utility and versatility, they have not found a scope of use as extensive as the advantages indicate. To a large degree, such reluctance stems from weaknesses inherent in equipment presently available.

While there may be other reasons and faults, poor visibility, inconvenience, and limitations in the number of functions that may be simultaneously plotted, are, perhaps, the greatest faults.

Poor visibility results from obstruction to clear and full viewing of a trace or plot, while the same is being made. Thus, monitoring may not be timely if removal from view of an obstructing element is necessary. Inconvenience stems mainly from the use of ink or ordinary paper in present recorders. The same creates the problems of smearing, clogging, accidental blotting and unevenness of trace. Also, chart paper changes and other similar chores frequently increase inconvenience.

Limitations in the number of plotted functions result from mutual interference of the several marking instruments used. These limitations particularly affect the ability of the recorder to handle intersecting traces such as may be made from the different paths of several aircraft; some limited interchange, slowly made, has been attempted, but is generally unsatisfactory.

In addition to the three faults above listed, cost and size are important factors that affect accuracy, speed of response, etc.

Recognizing the foregoing and seeking to correct the same, it is an object of the present invention to provide recording indicating apparatus that is adapted to plot several traces of functions simultaneously.

Another object of the invention is to provide a record indicator in which the entire plotting area or face is fully visible at all times and especially while plotting is in progress.

A further object of the invention is to provide recording apparatus of the character referred to that, with equal facility, may be made in a large range of sizes and, regardless of size, will be simple, dependable, low in cost, accurate, rapidly responsive, etc.

A still further object of the invention is to provide apparatus of the type referred to in which a plurality of plotting traces may be simultaneously produced and which may be color-coded for improved or enhanced differentiation.

A further object of the invention is to provide recording and indicating apparatus in which one or more of a plurality of traces may be removed or eliminated while the others are being produced, without affecting said other traces.

A yet further object of the invention is to provide apparatus for recording and indicating in which graphic representations additional and/or auxiliary to the functions of the traces being plotted may be provided, the same serving to coordinate the plots, set an environment therefor, or generally improve the information being given.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration or example only.

In the drawings, like reference characters designate similar parts in the several views.

Fig. 1 is a perspective view, in semi-diagrammatic form, of rectangular-coordinate plotting apparatus according to the present invention.

Fig. 2 is an enlarged fragmentary cross-section view of the marking means that form traces, the same constituting a component of the apparatus shown in Fig. 1.

Fig 3 is a longitudinal sectional view, taken on the plane of line 3—3 of Fig. 1, the view embodying details additional to those shown in Fig. 1.

Fig. 4 is a perspective view, in schematic form, showing a plurality of devices as shown in Figs. 1 and 3 and arranged to project the plots, traces or recordings thereof upon a common viewing surface.

Fig. 5 is a diagrammatic view showing optical requirements for superposition of plotted records, the same being based on the showing of Fig. 4.

Fig. 6 is a wiring diagram showing a preferred manner of controlling the movement of the marking instrument of the present apparatus.

Fig. 7 is a front view of a modification in which the plotting apparatus is adapted for polar coordinates.

Fig. 8, diagrammatically, shows the basic coordinate system that may be used by the apparatus of Fig. 7.

The invention contemplates adapting optical projector techniques to mechanical or electro-mechanical plotters or recorders to increase flexibility and general usefulness of such plotters and recorders, as characterized in the foregoing preamble. To this end, the invention contemplates keeping the plotting area wholly clear of operating mechanism and providing full transparency to the instrumentalities that produce a plot or trace. Thus, a plot or trace may be produced while the same is under observation and clear and unobstructed visibility had at all times. While the present apparatus may produce a trace that is darker than its background or field, it is contemplated to produce a trace that comprises an illumined line on a dark field or background. Accordingly, the invention contemplates marking or tracing on an opaque field to produce therein a transparent trace which is ideally adapted for optical projection for clear and easy visibility. Two or more such traces may be projected upon a common viewing field or screen and, for improved contrast, the same may be projected with lights of different colors.

While transmitted light for trace projection is preferred, opaque or non-reflective plotting or recording media, as hereinbefore suggested, may be coated upon reflective material and the same transmitted by projection of reflected light.

The apparatus that is illustrated in Figs. 1, 2 and 3 comprises, generally, tracing or plotting means 10, means 11 to move the means 10 in one direction, as exemplified by the arrow H, means 12 to move both the means 10 and 11 in a transverse direction, as exemplified by the arrow V, the two means 11 and 12, therefore, providing universal movement in a single plane of the means 10, plotting field means 13 operatively engaged by the tracing means 10, means 14 providing projecting illumination of the trace produced on the means 13, and means 15 constituting an optical projector of the trace.

The tracing or plotting means 10 that is illustrated preferably comprises a flat transparent sheet or plate 20 of rectangular form, the same being provided with oppositely disposed bearings 21 and 22 in the form of ears that are integrally provided on frame elements 23 and 24 connected to opposite edges of plate 20.

Plate 20 is preferably made of a heat-resistant and non-shatterable material, such as Pyrex glass, or one of the clear plastics, such as Lucite. According to the invention, said plate 20 mounts a transparent stylus or marker 25 that may be made of fused quartz or the like. A preferred position for said stylus is about central of the plate 20 and projecting as a relatively sharpened point 26 from one face of said plate.

The mentioned connection between plate 20 and the frame elements 23 and 24 is a lateral and resilient one, as shown in Fig. 3. Said frame elements are provided with headed studs 27 that extend through suitable apertures in frame elements 28 and 29 along opposite edges of the plate 20. Springs 30 are interposed between the pairs of elements 27 and 28, along one edge, and elements 24 and 29, along the other edge, said springs producing a light resilient force that biases the stylus laterally toward the plotting field means. The heads on said studs 27 limit the outward position of the plate 20.

The means 11 is shown as a lead screw 31 engaged with threads provided in ears 22, said screw being carried by a frame 32. Rotation of said screw is imparted by a servomotor or the like 33 carried by said frame 32, such rotation producing movement of the plotting means 10 in the directions of arrow H and depending on the direction of rotation of said lead screw. A guide bar 34, carried by frame 32, is engaged by ears 21 to hold the means 10 in the position shown. Frame 32 is shown as of U shape, the means 10 being disposed in the hollow thereof.

The means 12 is shown as a lead screw 35 that is perpendicular to screw 31 and is threadedly engaged with frame 32, said screw 35 being carried by a frame suggested by the elements 36. Rotation of screw 35 is imparted by a servomotor 37 carried by one of the frame elements 36 to cause movement of frame 32 and, therefore, of means 10 in the direction of arrow V and depending on the direction of rotation of lead screw 35. A guide bar 38 extending between the frame elements 36 guides frame 32 for vertical movement in the same way that bar 34 guides the means 10 for horizontal movement.

It will be clear from the foregoing that the stylus 25 is capable of being moved universally by the means 11 and 12 in the plane in which the means 10 is mounted and within the limits of size of frame 32 and the frame comprising elements 36.

The plotting field means 13 is shown as a transparent plate 39 disposed in parallelism with plate 20 and substantially smaller in length and width than said plate 20. It is the plate 39 against which the springs 30 bias the sharp or pointed end of stylus 25 (Figs. 2 and 3). The face of plate 39 thus engaged is shown as provided with a preferably opaque coating 40. Wax or gelatin, that sets to a consistency which enables the same to be displaced by a sharp instrument, may be used, Fig. 2 showing how the stylus 25, during its movement, causes such displacement to leave a clear trace 41 that is flanked on either side by thickened portions 42 of the coating which imparts improved definition to the trace.

As will be later described, the motors 33 and 37 are controlled by outside signals and their motions may be controlled by multi-turn potentiometers 43 and 44 connected to the respective shafts 31 and 35. Said potentiometers, operating directly from said shafts, constitute reference means for the stylus position along its lines of movement. Thus, data that can be supplied in Cartesian coordinates may be plotted directly.

The above described plotting and field means may be illuminated to pass light through plate 20 and stylus 25 as exemplified by arrows 45, said light being intercepted in whole or in part by the coating 40 and passing through plate 39 wherever a trace 41 is formed in said coating. The arrow 46 indicates such light transmission. The means 14 provides such illumination and is here shown, in typical fashion, as a source of light 47 that includes a suitable reflector 48 and suitable condensing lenses 49 interposed between the light source and the means 10 and 13. Said light source and lenses may be enclosed in a housing tube 50.

The projector 15 is generally conventional, comprising objective lenses 51 and an optional color filter 52 carried in the projecting end of a housing tube 53. The image of the plotting field is projected by the means 15 onto a suitable screen such as shown at 54 (Fig. 4).

Fig. 1 shows elongated slideways 55 that comprise means for facilitating positioning of the plate 39 with respect to plate 20 and stylus 25. During positioning movement of said plate, it is essential that the stylus be retracted. To this end a series of solenoids 56 may be carried either by slideways 55 or by similarly disposed frame bars 57 which are immovable with the projector tube 53. Said solenoids are provided with movable cores 58 and are provided with blunt ends or heads 59 that are projected by springs 60 against plate 20. When the solenoids are de-energized, said springs 60 press plate 20 away from plate 39 as allowed by the resistance of springs 30. When stylus marking position is desired, the solenoids are energized to retract the cores 58 and allow said springs 30 to project plate 20 and provide spring-biasing pressure of the stylus on plate 39. Now, when the means 10 is moved relative to the means 13, a trace 41 will be formed in the coating 40. Such separation of plates 20 and 39 may be effected also when it is desired to move the stylus from one position to another without making a trace. Thus, point-to-point plotting may be carried out with easy facility by momentarily energizing the solenoids to make traces comprised of spaced points.

The above described apparatus may be made quite small with attending lower cost of production. The projector comprises the means that enables presenting the relatively small trace that is produced in quite large form with little loss, if any, in accuracy. Also, the small mechanism may be designed to have a high speed of operation—a factor that remains under projection and which would be quite costly in a mechanism composed of substantially larger components.

A contemplated modification of the means 13 is to substitute flexible film for the plate 39 and by rolling said film onto one roller from another, the plotting field may be changed with easy facility. Also, the latter modification lends itself to a continuous feeding movement of the film while the stylus is controlled to move transversely to the film movement.

By superimposing the projected images of the traces of two or more plotters, the exact relationship of said traces can be more readily determined than by other means presently available. This is shown in Figs. 4 and 5, wherein the screen, whether directly or through the medium of reflecting mirrors, receives the images projected by the plotters 61, 62 and 63, each similar to the apparatus above described. It will be noted that these traces 64, 65 and 66 may intersect without interference and that the same are unobstructed, clear and continuous. By producing traces that are comprised of lines of light against a dark background, there is no variation in background illumination and the clarity of the traces remains substantially constant.

Differentiation among the traces projected may be effected by color-coding the same by using differently colored filters 52 in the different plotters 61, 62 and 63. In addition, if a particular trace is to be viewed without relationship to the others or to insure accuracy of identification of any one or more of the traces, a control unit 67 may be provided, the same having switch means for ready cutting in or out of any plotters. Thus, one trace may be viewed while the other plotters are darkened to temporarily eliminate the other traces. The darkened plotters continue to function as before and when placed again in projection, the traces thereof will be complete just as if the same had not been darkened.

From the foregoing, it will be clear that the number of traces that may be projected simultaneously may be quite large without creating confusion. At least the seven basic spectrum colors may be used with minimum possibility of confusion. By using two or more degrees of color saturation or intensity, of each basic color, a commensurately greater number of identifiable traces may be simultaneously projected.

Since the plotters must necessarily have a parallax displacement but their images impinge a common screen, their respective objective lenses 68, 69 and 70 are so displaced (Fig. 5) as to bring the images into exact superimposition, as shown.

Fig. 6 shows a preferred form of control circuitry that may be applied to the present apparatus. The present circuit embodies an error detector 71 between an input voltage $e_x$ and an output voltage $e_x$, as may be desired from feedback potentiometer 43. The differential voltage thus provided is amplified by amplifier 73, the same driving the servomotor 33 until the input and output voltages equalize. Thus, the stylus 25 has been moved to a position in accordance with the value of $e_x$. Separate controls 74 and 75 may be provided that allow the position of the stylus at $e_x=0$ to be varied and control the scale factor, i. e., how much stylus displacement a given voltage differential will produce. Provision may also be made to operate solenoids 56 from an independent power source 76. The above described $e_x$ circuitry may be substantially duplicated for input $e_y$ to control synchromotor 37, as shown in Fig. 6.

The circuitry above described is intended as exemplary, since the same is based on known techniques for controlling the operation of servomotors, and is here given for reasons of clarity.

The modification of Fig. 7 shows the hereinbefore described plotter and the numerals before used are used therein, where the parts are similar to the earlier described apparatus. Fig. 8 shows the basic coordinate system that may be used. Input references are assumed to be angle $\theta$ measured from the line OA around the origin O clockwise to point P. A radial distance $p$ is given from origin O to point P.

Returning to Fig. 7, the bar 34 and the lead screw 31 are carried by an azimuth ring 80 that replaces frame 32 and may be rotated around its center according to the requirements of $\theta$. Shaft 31 drives the stylus plate 20, as before, linearly as a function of $p$ (Fig. 8) and is driven by servomotor 33a through shaft 81 and gearing 82 connecting the latter shaft and lead screw 31. As before, potentiometer 43 supplies a reference voltage that is related to the radial movement of the stylus 25 as the ring 80 is rotated.

The azimuth ring 80 is shown as supported by idler gears 83, and engaged by a driving gear 84 and a driven gear 85. Gears 83, 84 and 85 are mounted on fixed members 86 and the four-point support thus afforded the azimuth gear enables ready change of the angle $\theta$, as caused by servomotor 37a that drives gear 84.

The driven gear 85 is connected to drive potentiometer 44 and this drive is reduced by suitable gearing provided so that one revolution of ring 80 causes one revolution of potentiometer 44. Thus, the reference voltage from potentiometer 44 is directly related to the rotation of the axis of movement of stylus 25.

The apparatus of the modification may be provided with a light source and projector means as before without change.

The described polar coordinate plotter may itself be varied to plot or indicate functions in parabolic, hyperbolic and other coordinate systems, it only being necessary to provide for movement of the azimuth ring in a path according to the geometric requirements of such other functions.

While the foregoing has illustrated and described what are now contemplated to be the best modes of carrying out our invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described our invention, what we claim and desire to secure by Letters Patent is:

1. Data-plotting and projection-indicating apparatus comprising a plurality of data-plotting and projection-indicating units, each unit comprising a substantially transparent mounting plate, a marking instrument on said plate, an opaque-coated transparent plotting field member engaged with said instrument, means to move said plate and plotting field member relatively to each other to cause the instrument to mark a trace on the coating of the plotting field member, light projector means that directs its beam through both the transparent plate and the trace on the opaque coating on the plotting field member to project an image of the mentioned trace of each unit, and a single screen on which the images projected from each unit are shown in superimposed relation.

2. Data-plotting and projecting-indicating means comprising a substantially transparent plot member provided with an opaque coating of removable material, a second substantially transparent member arranged in parallelism with the first member, a stylus carried by the second member in marking engagement with the removable material on the first member, means to move said members relatively to each other to cause the stylus on the second member to remove material from the coating on the first member and thereby form a transparent trace on the first member, according to the directions of such movements, and means to direct a light beam through the second member onto the first member to illuminate the trace, and means to project an illuminated image of said trace.

3. Data-plotting and indicating apparatus comprising a frame, a substantially transparent plate mounted within said frame, said plate being movable in a plane in one direction within said frame, and said frame and plate together being movable in the same plane in a second direction transverse to the first direction, means causing the above-mentioned movements of the frame and plate, a stylus carried by said plate and centrally located thereon, a plotting field member adjacent and parallel to said plate, and resilient means engaged with and urging the plate together with the stylus thereon toward the plotting field member to cause said stylus to trace a continuous plot upon the plotting field member, and means to illuminate said plot through the transparent plate.

4. Data-plotting and indicating apparatus according to claim 3 in which the plotting field member comprises a second substantially transparent plate, said transparent plate having a thin markable coating thereon and in which said stylus traces the above-mentioned plot by marking the coating.

5. Data plotting and indicating apparatus according to claim 3 in which the plotting field member comprises a strip of film, and means to move said film past the plate as the stylus traces the mentioned plot thereon.

6. Data-plotting and projection-indicating means comprising a substantially transparent plot member provided with an opaque coating of removable material, a second substantially transparent member arranged in parallelism with the first member, a stylus carried by the second member in marking engagement with the removable material on the first member, means to move said members relatively to each other to cause the stylus on the second member to remove material from the coating on the first member and thereby form a transparent trace on the first member according to the directions of such movements, and means to direct a light beam through both the transparent member and the trace on the first member to illuminate the trace, and means to project an illuminated image of said trace.

7. Data plotting and projection-indicating apparatus comprising at least two data plotting and projection indicating units, each unit comprising a frame, a substantially transparent plate mounted within said frame, said plate being movable in one direction within said frame and said frame and plate together being movable in a second direction transverse to the first direction, means for causing the mentioned movements of the frame and the plate, a stylus carried by said plate and centrally located thereon, a plotting field member adjacent and parallel to said plate, resilient means adapted to urge the plate, together with the stylus thereon, toward the plotting field member to permit said stylus to trace a continuous plot, and means for directing a beam of light through the plate and plotting field member for projecting an image of the plot traced upon the plotting field member, the last-mentioned means of each unit being adapted to project the image so that the image projected from one unit will be superimposed upon the image projected from another unit.

8. Data plotting and projection-indicating apparatus according to claim 7 in which the plotting field member comprises a strip of film, and means to move said film past the plate as the stylus traces the mentioned plot thereon.

9. Data plotting and projection-indicating apparatus according to claim 7 in which the plotting field member comprises a second substantially transparent plate, said plate having a thin markable coating thereon.

10. Data plotting and projection-indicating apparatus according to claim 7 in which the plotting field member comprises a second substantially transparent plate, said plate having a thin markable coating thereon, and in which said stylus traces the mentioned plot by marking the coating.

11. Data plotting and projection-indicating apparatus according to claim 7 in which the resilient means urges the stylus against the plotting field member only when the means to move the plate and frame moves the same.

12. Data plotting and projection-indicating apparatus according to claim 7 in which the means to move the plate and frame comprises a pair of servomotors and a pair of potentiometers.

13. Data plotting and projection-indicating apparatus according to claim 7 in which each means in each unit for directing a beam of light is adapted to project a different color of light.

References Cited in the file of this patent

UNITED STATES PATENTS

| | | |
|---|---|---|
| 1,009,897 | Dexter et al. | Nov. 28, 1911 |
| 1,052,835 | Littman | Feb. 11, 1913 |
| 1,119,597 | Henry | Dec. 1, 1914 |
| 1,319,820 | Williams | Oct. 28, 1919 |
| 1,545,674 | McKay | July 14, 1925 |
| 1,666,304 | Proctor | Apr. 17, 1928 |
| 1,704,811 | Stuber | Mar. 12, 1929 |
| 2,413,300 | Dunn et al. | Dec. 31, 1946 |
| 2,584,267 | Hayek | Feb. 5, 1952 |
| 2,714,330 | Frederickson | Aug. 2, 1955 |